United States Patent [19]

Hughes

[11] Patent Number: 4,467,466

[45] Date of Patent: Aug. 21, 1984

[54] VIDEO DISK PLAYER HAVING DOOR LOCK MECHANISM

[75] Inventor: Larry M. Hughes, Indianapolis, Ind.

[73] Assignee: RCA Corporation, New York, N.Y.

[21] Appl. No.: 464,085

[22] Filed: Feb. 4, 1983

[51] Int. Cl.³ ............................................. G11B 17/04
[52] U.S. Cl. .................................................... 369/77.2
[58] Field of Search ........................................ 369/77.2

[56] References Cited

U.S. PATENT DOCUMENTS

| | | | |
|---|---|---|---|
| 4,408,321 | 10/1983 | Yamamura | 369/77.2 |
| 4,426,695 | 1/1984 | Moriki et al. | 369/77.2 |
| 4,432,084 | 2/1984 | Fukumitu et al. | 369/77.2 |
| 4,433,405 | 2/1984 | Saito | 361/77.2 |

Primary Examiner—Steven L. Stephan

Attorney, Agent, or Firm—Eugene M. Whitacre; William H. Meise; Dilip A. Kulkarni

[57] ABSTRACT

The caddy door is connected to a pair of front record receiving pads by means of a compliant member such that the caddy door is shut and open when the front receiving pads are respectively advanced and retracted. The connecting member is provided with a raised portion which engages the caddy door to prevent it from fully opening when a caddy is forced into the player. When the front receiving pads are retracted, the raised portion on the connecting member is displaced out of the way to allow insertion of a caddy into the player. In accordance with a further feature of the invention, the top wall of the input slot is provided with a groove into which the front edge of the caddy is guided to prevent further caddy insertion when the caddy door is prevented from fully opening.

18 Claims, 7 Drawing Figures

VIDEO DISK PLAYER HAVING DOOR LOCK MECHANISM

This invention relates to a video disc player, and more particularly, to a video disc player which uses a protective record caddy to load and unload a record into and from the player.

In a capacitance-type video disc system, audio and video information is recorded as geometric variations in a spiral information track on a disc record having a conductive property. A variable capacitance is formed between a stylus-mounted electrode and the conductive property of the disc record. As the record is rotated, the signal recovered at the stylus electrode is related to the varying capacitance, which, in turn, is directly related to the signal recorded in the information track. The recovered signal is then processed for application to a television receiver for playback of the recorded video and audio information. One example of this type of video disc system is described in U.S. Pat. No. 3,842,194 granted to J. K. Clemens.

It is beneficial to enclose a video disc in a protective caddy, which comprises a record retaining spine removably located within an outer jacket or sleeve. The record retaining spine has an opening in which a record is received to form a record/spine assembly. For record loading, a full caddy is inserted into an input slot provided in a video disc player at its front end. A record extracting mechanism disposed in the player removes the record/spine assembly from the caddy during subsequent jacket withdrawal, whereby the record is retained inside the player resting on a set of front and back record receiving pads. The retained record is then transferred to a rotatable turntable for playback. For record retrieval, the record is transferred back to the receiving pads, and an empty jacket is reinserted into the player to recapture the record/spine assembly.

In U.S. patent application of Hughes, Ser. No. 374,377, a record handling mechanism is described for selectively transferring a retained record between the turntable and the front and back record receiving pads. The Hughes mechanism includes a record lifting finger which protrudes through one of the slots in the turntable to lift a record resting on the record receiving pads disposed above the turntable. The record lifting finger drives the record against a pair of stops located above the pads, and the pads are displaced out of the way. The record lifting finger is then lowered to a position beneath the turntable to gently lower the record onto the turntable for playback. The sequence of operations is reversed to transfer the record back to the record supporting pads. The record lifting finger is raised to elevate a turntable-supported record to a position against the stops above the receiving pads. The record supporting pads are moved back in place, and the record lifting finger is then withdrawn to achieve the transfer of the record back to the pads to redefine the record/spine assembly. An empty record sleeve is reinserted into the player to retrieve the record/spine assembly. The video disc player is further equipped with a mechanism for stopping the turntable at an angular position such that one of the turntable slots is over the record lifting finger to allow it to pass through, so that the record can be transferred to and from the receiving pads.

It is desirable to provide the caddy input slot with a door to keep out the dust and debris. The caddy door is pivotally mounted to the bottom wall of the input slot, and is yieldably coupled to the front receiving pads by a compliant member. The caddy door opens and closes the input slot when the front receiving pads are, respectively, retracted and advanced. The yieldable coupling between the caddy door and the front receiving pads is provided to prevent inadvertent damage to the front pads when an attempt is made to force open the caddy door by inserting a caddy into the player.

Typically, the player of this type is subject to disposition in one of three operating modes—OFF, LOAD/UNLOAD, and PLAY. In the OFF mode, the front receiving pads are advanced to close the caddy door, and the record lifting finger is raised through one of the turntable slots to hold the turntable in place. To load a record into the player, the player is disposed in the LOAD mode. When so disposed, the record receiving pads are retracted, and the record lifting finger is slightly lowered to a position below the receiving pads (but still above the turntable). The retraction of the front receiving pads opens the caddy door. The full caddy is then inserted into the player, and the sleeve is extracted out to leave the record/spine assembly inside the player. To transfer the retained record to the turntable, the player goes from the LOAD mode to the PLAY mode. The record lifting finger is raised to drive the retained record against the stops, the record receiving pads are shifted out of the way, and the record lifting finger is lowered to a position below the turntable. When the front receiving pads are thus displaced out of the way, the caddy door is closed. The turntable drive motor is then started, and the playback sequence is initiated.

To retrieve the record after playback, the sequence of operations is reversed. The player goes from the PLAY mode to the UNLOAD mode. The turntable is stopped such that one of the slots is over the record lifting finger. The record is raised against the stops. The receiving pads are moved back in place. The caddy door is opened when the front receiving pads are moved back. The record is lowered onto the receiving pads to redefine the record/spine assembly. An empty sleeve is then reinserted into the player to recapture the record/spine assembly.

After record removal, the player is driven from the UNLOAD mode to the OFF mode. In the process, the front pads are advanced to close the caddy door, and the record lifting finger is raised through a turntable slot to lock the turntable in place.

The caddy door is held in the closed position by the compliant coupling member when the player is in the OFF mode and in the PLAY mode as will be seen from the above description. It is possible to insert a full caddy into the player when the player is in the OFF mode by forcing open the caddy door. It is also possible to drive an empty sleeve into the player when it is in the PLAY mode, and then retrieve the record retaining spine without retrieving the associated record. Forcing a full caddy into the player when the player is in the OFF mode creates the risk of damaging player mechanisms. Forcing an empty sleeve into the player when the player is in the PLAY mode, and then retrieving it, traps the record inside the player, and thereby making it difficult to remove it.

It is desirable to positively prevent the caddy door from fully opening when the player is in the PLAY mode or in the OFF mode. In accordance with this invention, the compliant door coupling member is provided with a raised portion, which is dimensioned and located such that it engages the caddy door to prevent it from fully opening when the front receiving pads are advanced. The raised portion on the compliant member is displaced out of the way upon retraction of the front receiving pads (in response to the disposition of the player in the LOAD/UNLOAD mode) to permit the caddy door to fully open.

According to a further feature of the invention, the upper surface of the caddy input slot is provided with a groove into which the front edge of a caddy is guided to block further caddy insertion when the raised portion of the door coupling member prevents the caddy door from fully opening upon insertion of the caddy into the input slot. In the drawings.

Figure 1:
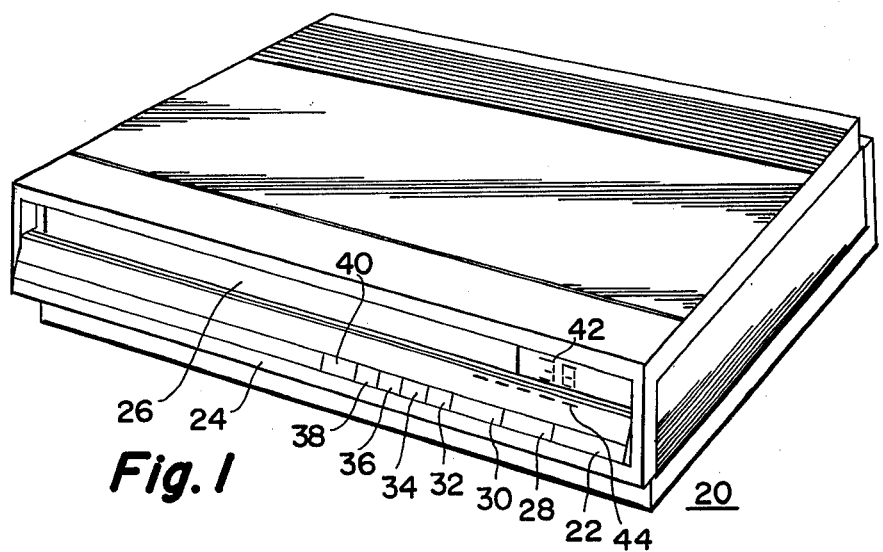
FIG. 1 shows a video disc player incorporating the caddy door lock mechanism.

Shown in FIG. 1 is a video disc player 20 incorporating the instant caddy door lock mechanism. To play a disc, the player is turned on by pressing the POWER button 22 located on the front panel 24. A full record caddy is inserted into the player through a caddy input slot 26, and the empty caddy sleeve is then extracted therefrom leaving the enclosed record/spine assembly inside the player. The caddy input slot 26 is equipped with a pivotally-mounted door to keep out the foreign matter. The record is automatically deposited on a rotatable turntable, and played back through a conventional television receiver. At any point during playback, the viewer can reject the remainder of the record by depressing the REJECT button 28, or interrupt the program by activating the PAUSE button 30. In the PAUSE mode, the pickup stylus is raised, and its lateral motion is arrested. When the PAUSE button 30 is operated again, the stylus is lowered and the playback is resumed. A set of pushbuttons 32, 34, 36 and 38 are arranged on the instrument panel 24 to dispose the player in any one of four search modes—i.e., visual search (forward/reverse) and rapid access (forward-/reverse)—to enable the viewer to quickly locate a precise section of the prerecorded program. In visual search, the stylus is rapidly moved across the record (16X) while in engagement therewith. In rapid access, the stylus is swept across the record at a much greater speed (120X) while the stylus is down. The player has a CHANNEL A/B button 40 to select any one of two audio channels in the event of a bilingual program disc. An LED indicator 42 shows the elapsed playing time. Various player functions—such as SIDE 1-2, CHANNEL A/B, STEREO—are indicated by a plurality of light indicators 44.

Figure 2:
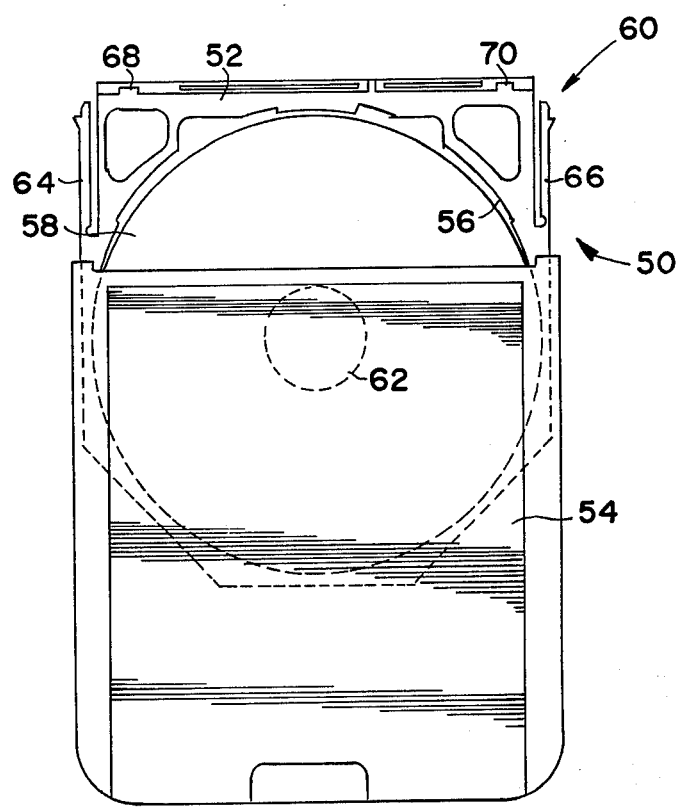
FIG. 2 illustrates a video disc caddy suitable for use with the video disc player of FIG. 1 in the practice of the subject invention.

The caddy 50, depicted in FIG. 2, consists of a planar record retaining spine 52 removably enclosed in a flat outer sleeve 54. The retaining spine 52 has an opening 56 in which a centrally-apertured record 58 is received forming a record/spine assembly 60. The numeral 62 denotes the record center hole. Integrally molded with the spine 52 are spine latch fingers 64 and 66 for releasably securing the spine 52 in its sleeve 54. The spine 52 has cutouts 68 and 70 in which the respective spine gripper members of the player are received to secure the spine to the player for reasons explained later.

Figure 3:
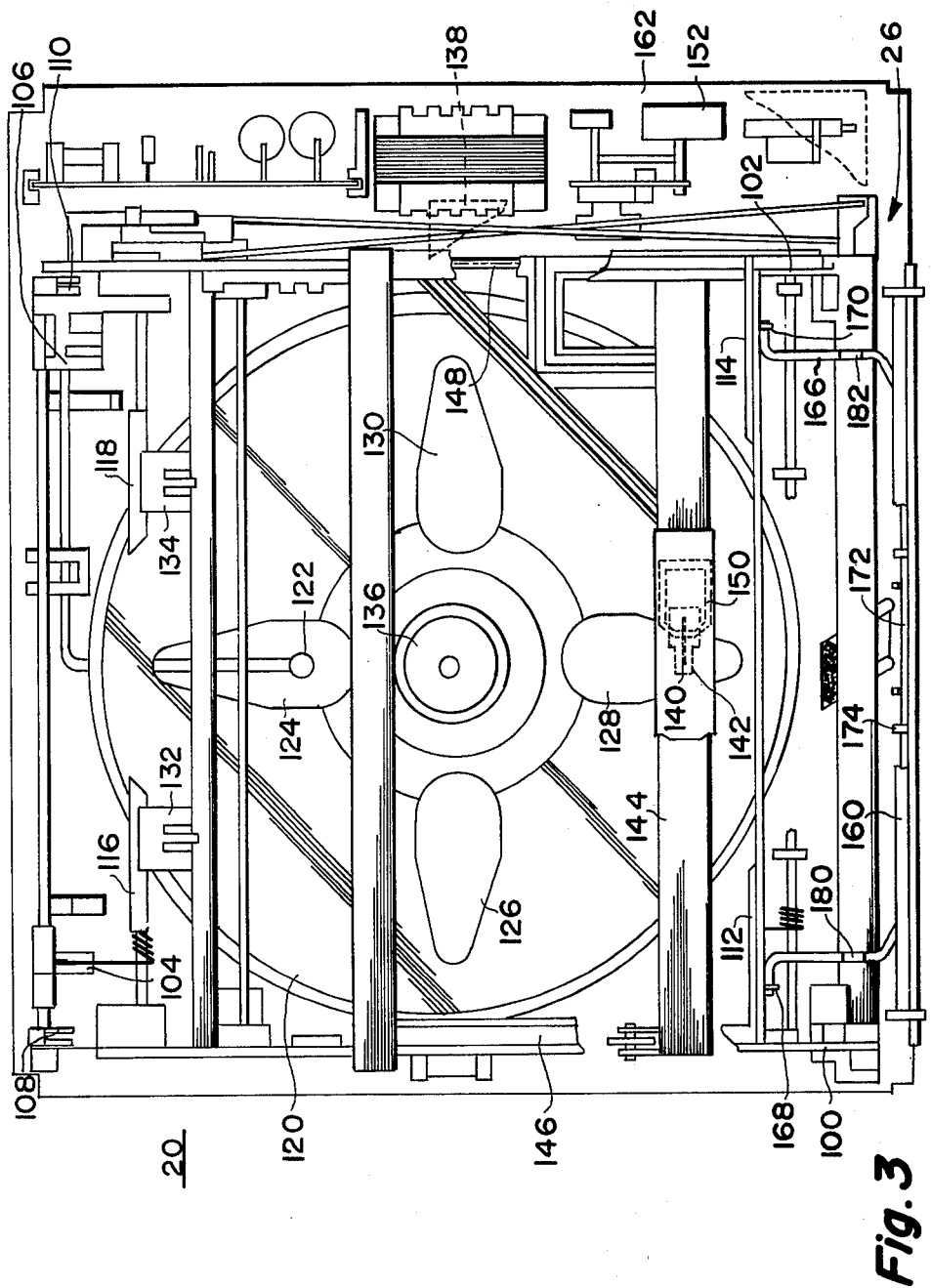
FIG. 3 is a plan view of the FIG. 1 video disc player with its cover removed to show the underlying details.

To load a record, a full caddy 50 is inserted into the player through the input slot 26 along the guide tracks 100 and 102 depicted in FIG. 3. A pair of spine latch members 104 and 106 engage the cutouts 68 and 70 in the spine 52 to lock it to the player upon a full insertion of the caddy 50 into the player. Simultaneously, a pair of latch defeat fingers 108 and 110 enter into the jacket 54 to defeat the spine latch fingers 64 and 66 to free the spine 52 from the jacket. The empty jacket 54 is then withdrawn to leave the enclosed record/spine assembly resting on a set of retractable record receiving pads 112, 114, 116 and 118.

To transfer the retained record 58 to a turntable 120, a record transfer rod 122 is raised through one of the four holes 124, 126, 128 and 130 in the turntable to drive the record up against a pair of stops 132 and 134. The record receiving pads 112, 114, 116 and 118 are then shifted out of the way, and the record transfer rod 122 is gently lowered to a level below the turntable 120 to cause the record 58 to deposit on the turntable. The turntable 120 is provided with a spindle 136, which engages the center hole 62 of the record 58 placed on the turntable to center it.

To drive the turntable 120, the player has a brushless DC motor located underneath the turntable. A microcomputer 138 controls the operation of the turntable drive motor. A commonly-assigned U.S. patent application, Ser. No. 405,441, of Kelleher et al. describes the turntable motor.

A pickup stylus 140 is housed in a protective cartridge 142, which, in turn, is located in a slidable carriage 144. The carriage 144 is translatably mounted for a front-to-back motion along a pair of guide rails 146 and 148. A stylus lifter 150, disposed in the carriage 144, gradually lowers the stylus 140 onto the record 58 resting on the turntable 120. During playback, a microcomputer-controlled DC stepper motor 152 drives the carriage 144 so as to cause it to follow the radially inward motion of the pickup stylus 140.

Following playback, the turntable drive motor is switched off, and the carriage 144 is returned to its off-record home position. The microcomputer 138 ensures that one of the four turntable slots 124, 126, 128 and 130 is over the record lifting finger 122 when the turntable drive motor is turned off. The details of how the turntable 120 is stopped at one of the four angular positions are given in the afore-mentioned Kelleher et al. patent application.

To transfer the turntable-supported record 58 to the receiving pads 112, 114, 116 and 118 to form the record/spine assembly 60, the record transfer rod 122 is raised through the opening 124 in the turntable 120 to lift the record to the position against the stops 132 and 134, the receiving pads are moved back in place, and the record transfer rod 122 is lowered to an intermediate position (below the pads but above the turntable). An empty jacket 54 is reinserted into the player to retrieve the record/spine assembly 60. The record transfer mechanism is described in detail in the aforesaid Hughes patent application.

Figure 4:
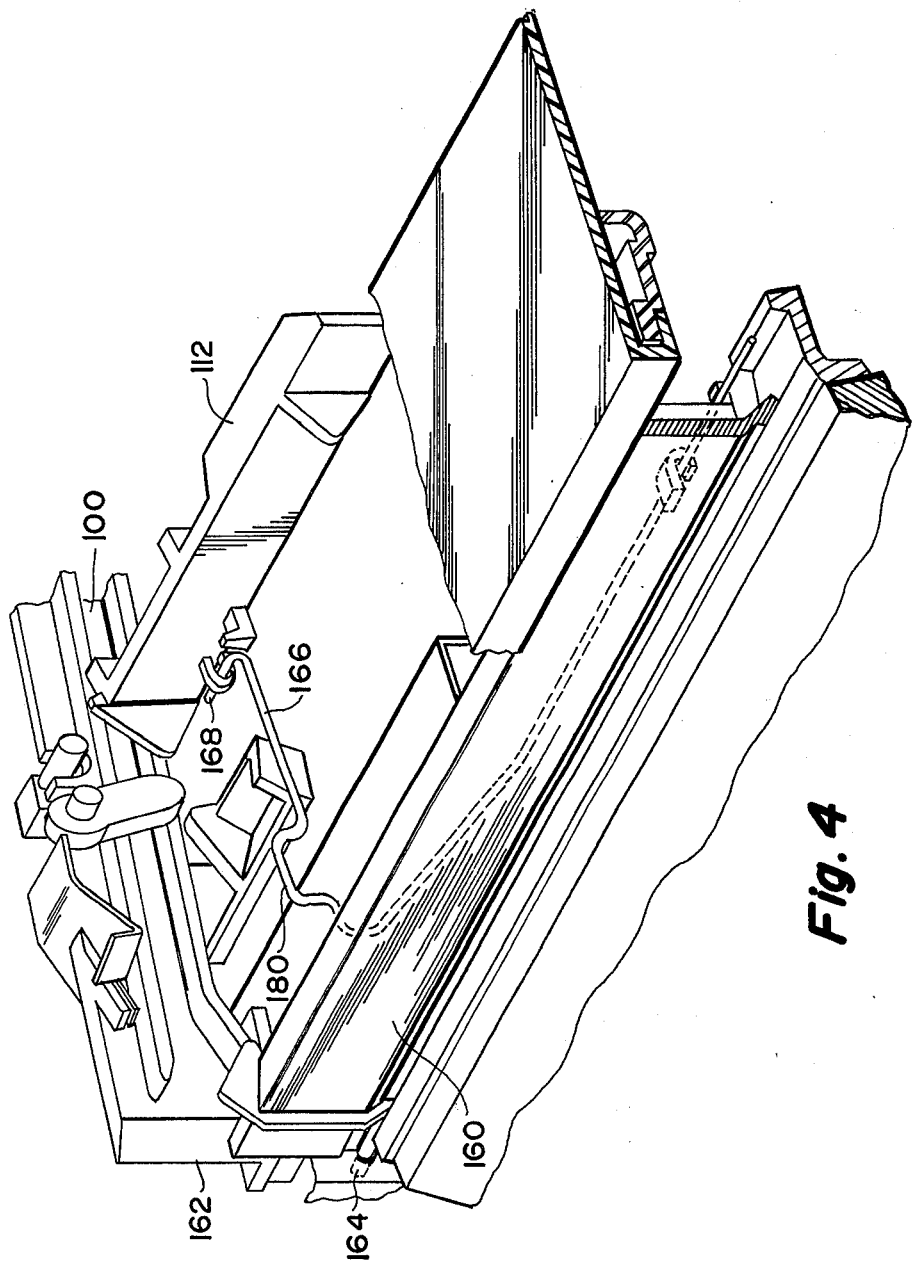
FIG. 4 represents a partial perspective view of the video disc player of FIGS. 1 and 3 showing the particulars of the caddy door lock feature of the present invention.

The caddy input slot 24 is fitted with a swingable door 160, which is pivotally mounted to the player housing 162 by a set of integrally-molded pins—indicated by a numeral 164 in FIG. 4. A U-shaped wire form 166 yieldably connects the front receiver pads 112 and 114 to the swingably-mounted caddy door 160 such that the caddy door is closed and opened when the front pads are respectively advanced (FIGS. 5 and 6) and retracted (FIG. 7). The ends 168 and 170 of the wire form 166 are secured to the respective front receiver pads 112 and 114. The middle portion 172 of the wire form 166 is attached to the caddy door 160 by threading it through a set of tabs, indicated by a numeral 174. The distance between the ends 168 and 170 of the wire form 166 is slightly more than the spacing between the points at which the wire form is connected to the front receiving pads 112 and 114 to cause it to bow toward the caddy door 160 as can be seen from FIG. 4. This feature allows the front receiving pads 112 and 114 to over-travel when advanced, to assure closure of the caddy door 160.

As indicated in the Hughes patent application, the record handling mechanism is subject to disposition in one of three modes in response to the operation of the POWER button 22—OFF, LOAD/UNLOAD, and PLAY. When the POWER button 22 is first pressed, the player is driven from the OFF mode to the LOAD mode to retract the record receiving pads 112, 114, 116 and 118, and to open the caddy door 160. A full caddy 50 is inserted into the player and the sleeve 54 is withdrawn to leave the record/spine assembly 60 resting on the record receiving pads 112, 114, 116 and 118. Upon the withdrawal of the caddy sleeve 54, the player automatically goes to the PLAY mode to close the caddy door 160 and to transfer the retained record 58 to the turntable 120. After completing the playback sequence, the player goes to the UNLOAD mode to transfer the record 58 back to the record receiving pads 112, 114, 116 and 118 to redefine the record/spine assembly and to open the caddy door 160. An empty sleeve 54 is then reinserted to capture the record/spine assembly 60, and the caddy 50 is withdrawn from the player. The POWER button is then depressed to advance the record receiving pads 112, 114, 116 and 118 to shut the caddy door 160, and to turn off the player.

As indicated previously, the caddy door 160 is held shut by the compliant wire form 166 when the player is in the OFF mode and in the PLAY mode. However, it is possible to force open the caddy door 160 by overcoming the spring force of the wire form 166, for instance, by inserting a caddy or sleeve into the player. To prevent the caddy door 160 from fully opening when it is held in the closed position by the wire form 166, the wire form, in accordance with this invention, is provided with raised portions 180 and 182.

Figure 5:
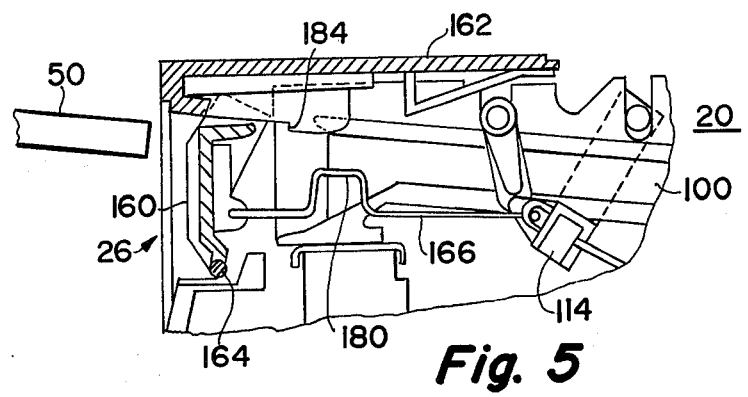
FIGS. 5-7 portray the operation of the instant caddy door lock mechanism.
Figure 6:
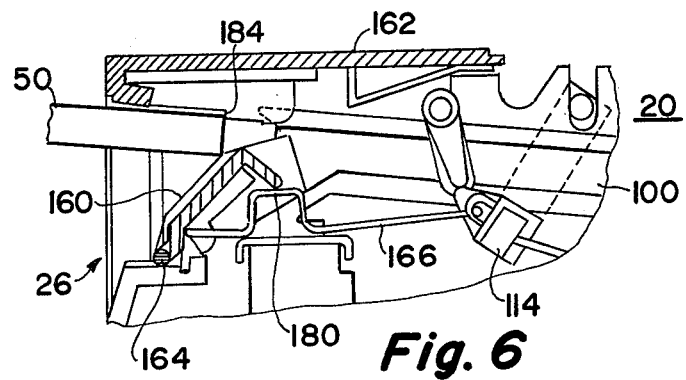
Figure 7:
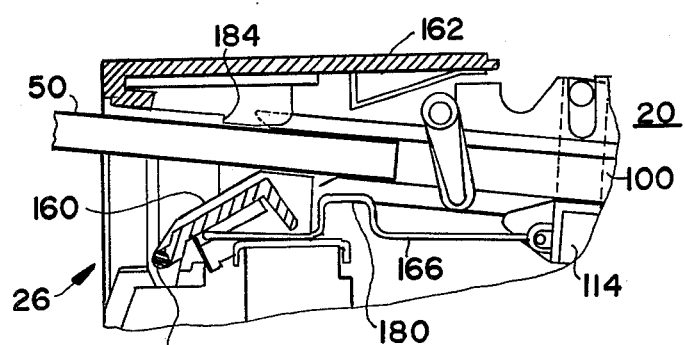

When the front receiver pads 112 and 114 are advanced (in response to the disposition of the player in the OFF or PLAY mode) in the manner shown in FIGS. 5 and 6, the raised portions 180 and 182 on the wire form 166 engage the caddy door 160 to prevent it from fully opening as a caddy 50 is inserted into the player. Upon retraction of the front receiver pads 112 and 114 (in response to the disposition of the player in the LOAD/UNLOAD mode), the raised portions 180 and 182 of the wire form are displaced out of the way, as shown in FIG. 7, to allow a caddy insertion.

In accordance with another feature of the subject invention, the upper surface of the caddy input slot 26 is provided with a groove 184 as shown in FIGS. 5–7. As a caddy 50 is inserted into the player when the player is either in the PLAY or OFF mode, its front edge rides up the caddy door 160, and then into the groove 184 in the manner shown in FIG. 6 to prevent further caddy insertion.

The caddy door lock feature according to this invention effectively prevents a caddy or an empty sleeve from forcing open the caddy door when the player is in either the OFF mode or the PLAY mode.

What is claimed is:

1. In a disc record player for use with a record caddy; said caddy consisting of a record retaining spine removably located within an outer sleeve; said retaining spine having an opening in which said record is received forming a record/spine assembly; said player having an input slot at its front end through which said caddy is inserted to load a record therein; said player retaining said record/spine assembly when said sleeve is extracted from said player after the insertion of a full caddy therein; said player being provided with a set of front and back record receiving pads for selectively supporting said retained record/spine assembly; said record receiving pads being subject to disposition in a retracted position to support a retained record and an advanced position to allow passage of said retained record to a rotatable turntable located underneath said receiving pads; said caddy input slot being equipped with a door coupled to said front receiving pads by a compliant member; said caddy door yieldably closing and opening said input slot when said front receiving pads are respectively advanced and retracted; the improvement comprising a raised portion disposed on said compliant coupling member located and dimensioned such that it engages said caddy door to prevent it from fully opening when said record receiving pads are advanced, thereby blocking insertion of a caddy or a sleeve into said player; the retraction of said front receiving pads displacing said raised portion on said compliant coupling member to a location such that it does not block said caddy door from fully opening.

2. The player of claim 1 wherein said compliant coupling member is a U-shaped wire form having its ends secured to said front receiving pads, and the middle portion secured to said caddy door.

3. The player as defined in claim 2 wherein the distance between said ends of said U-shaped wire form being slightly greater than the points on said front receiving pads where said ends are secured to cause said middle portion to bow out to allow overtravel of said front receiving pads.

4. The player as set forth in claim 2 wherein each of the side portions of said U-shaped wire form is provided with a raised portion to prevent said caddy door from fully opening when said record receiving pads are advanced; translation of said record receiving pads to said retracted position displacing said raised portions on said U-shaped wire form to locations such that they do not block said caddy door from fully opening.

5. The player as outlined in claim 1 wherein said input slot is defined by an upper surface and a lower surface; wherein said caddy door is pivoted about an axis disposed near said lower surface; wherein said upper surface of said input slot is provided with a groove into which the front edge of said caddy is guided to block further caddy insertion when said raised portion on said coupling member prevents said caddy door from fully opening upon insertion of said caddy into said input slot.

6. In a disc record player for use with a record caddy; said player having an input slot at its front end through which said caddy is inserted to load a record therein; said player being provided with a set of front and back record receiving pads for selectively supporting a record inserted into said player; said record receiving pads being subject to disposition in a retracted position to support a record inserted into said player and an advanced position to allow passage of said record to a rotatable turntable located below said receiving pads; said caddy input slot being equipped with a door coupled to said front receiving pads by a compliant member; said caddy door yieldably closing and opening said input slot when said front receiving pads are advanced and retracted respectively; the improvement comprising a raised portion disposed on said compliant coupling member located and dimensioned such that it engages said caddy door to prevent it from fully opening when said record receiving pads are advanced, thereby blocking insertion of a caddy into said player; the retraction of said front receiving pads displacing said raised portion on said compliant coupling member to a location such that it does not block said caddy door from fully opening.

7. The player of claim 6 wherein said compliant coupling member is a U-shaped wire form having its ends secured to said front receiving pads, and the middle portion secured to said caddy door.

8. The player as defined in claim 7 wherein the distance between said ends of said U-shaped wire form being slightly greater than the points on said front receiving pads where said ends are secured to cause said middle portion to bow out to allow overtravel of said front receiving pads.

9. The player as set forth in claim 7 wherein each of the side portions of said U-shaped wire form is provided with a raised portion to prevent said caddy door from fully opening when said record receiving pads are advanced; translation of said record receiving pads to said retracted position displacing said raised portions on said U-shaped wire form to locations such that they do not block said caddy door from fully opening.

10. The player as outlined in claim 6 wherein said input slot is defined by an upper surface and a lower surface; wherein said caddy door is pivoted about an axis disposed near said lower surface; wherein said upper surface of said input slot is provided with a groove into which the front edge of said caddy is guided to block further caddy insertion when said raised portion on said coupling member prevents said caddy door from fully opening upon insertion of said caddy into said input slot.

11. The player of claim 6 for use with a record caddy comprising a record retaining spine removably located within an outer sleeve; said retaining spine having an opening in which said record is received forming a record/spine assembly; said player retaining said record/spine assembly when said sleeve is extracted from said player after the insertion of a full caddy therein; said front and back receiving pads selectively supporting said record/spine assembly.

12. In a disc record player having an input slot through which a record is inserted into said player for playback; said record input slot being equipped with a door; said player being provided with an actuating member subject to disposition in a retracted position and an advanced position; said record door being coupled to said actuating member by a compliant coupling member such that said input slot is respectively closed and opened when said actuating member is advanced and retracted; the improvement comprising a raised portion disposed on said compliant coupling member located and dimensioned such that it engages said input slot door to prevent it from fully opening when said actuating member is advanced, thereby blocking insertion of a record into said player; the retraction of said actuating member displacing said raised portion on said compliant coupling member to a location such that it does not block said input slot door from fully opening.

13. The disc record player as set forth in claim 12 wherein said record is enclosed in a protective caddy which is inserted into said player through said input slot to load a record therein; said player being provided with a set of front and back record receiving pads for selectively supporting a record inserted into said player; said record receiving pads being subject to disposition in a retracted position to support an inserted record and an advanced position to allow passage of said record to a rotatable turntable located beneath said receiving pads; wherein said caddy door is coupled to said front receiving pads by said compliant member; said front receiving pads serving the function of said actuating member to selectively open and close said caddy door.

14. The player of claim 13 wherein said compliant coupling member is a U-shaped wire form having its ends secured to said front receiving pads, and the middle portion secured to said caddy door.

15. The player as defined in claim 14 wherein the distance between said ends of said U-shaped wire form being slightly greater than the points on said front receiving pads where said ends are secured to cause said middle portion to bow out to allow overtravel of said front receiving pads.

16. The player as set forth in claim 15 wherein each of the side portions of said U-shaped wire form is provided with a raised portion to prevent said caddy door from fully opening when said record receiving pads are advanced; translation of said record receiving pads to said retracted position displacing said raised portions on said U-shaped wire form to locations such that they do not block said caddy door from fully opening.

17. The player as outlined in claim 16 wherein said input slot is defined by an upper surface and a lower surface; wherein said caddy door is pivoted about an axis disposed near said lower surface; wherein said upper surface of said input slot is provided with a groove into which the front edge of said caddy is guided to block further caddy insertion when said raised portion on said coupling member prevents said caddy door from fully opening upon insertion of said caddy into said input slot.

18. The player of claim 17 for use with a record caddy comprising a record retaining spine removably located within an outer sleeve; said retaining spine having an opening in which said record is received forming a record/spine assembly; said player retaining said record/spine assembly when said sleeve is extracted from said player after the insertion of a full caddy therein; said front and back receiving pads selectively supporting said record/spine assembly.

* * * * *